(12) United States Patent
Kreiner et al.

(10) Patent No.: US 11,035,410 B2
(45) Date of Patent: Jun. 15, 2021

(54) ROLLING BEARING

(71) Applicant: Liebherr-Components Biberach GmbH, Biberach an der Riss (DE)

(72) Inventors: Stephan Kreiner, Ulm (DE); Martin Dahl Christensen, Wettingen (CH)

(73) Assignee: Liebherr-Components Biberach GmbH, Biberach an der Riss (DE)

(*) Notice: Subject to any disclaimer, the term of this patent is extended or adjusted under 35 U.S.C. 154(b) by 0 days.

(21) Appl. No.: 16/813,027

(22) Filed: Mar. 9, 2020

(65) Prior Publication Data
US 2020/0277990 A1 Sep. 3, 2020

Related U.S. Application Data

(63) Continuation of application No. PCT/EP2018/072822, filed on Aug. 23, 2018.

(30) Foreign Application Priority Data

Sep. 8, 2017 (DE) .................... 20 2017 105 464.0
Nov. 30, 2017 (DE) .................... 20 2017 107 296.7

(51) Int. Cl.
| | |
|---|---|
| *F16C 19/16* | (2006.01) |
| *F16C 33/38* | (2006.01) |
| *F16C 33/58* | (2006.01) |
| *F16C 33/66* | (2006.01) |
| *F16C 33/37* | (2006.01) |

(52) U.S. Cl.
CPC .............. *F16C 33/58* (2013.01); *F16C 19/16* (2013.01); *F16C 33/3706* (2013.01); *F16C 33/3818* (2013.01); *F16C 33/6651* (2013.01)

(58) Field of Classification Search
CPC ........ F16C 19/06; F16C 33/38; F16C 33/706; F16C 33/3818; F16C 33/6651
USPC ........ 384/516–517, 520, 523, 529, 531, 513
See application file for complete search history.

(56) References Cited

U.S. PATENT DOCUMENTS

| | | | |
|---|---|---|---|
| 3,292,981 A | 12/1966 | Zaugg | |
| 6,364,086 B1* | 4/2002 | Blaurock | ............ F16C 33/3825 |
| | | | 193/35 MD |
| 6,406,190 B1* | 6/2002 | Yoon | ...................... F16C 19/26 |
| | | | 384/551 |

(Continued)

FOREIGN PATENT DOCUMENTS

| | | |
|---|---|---|
| AT | 221319 B | 5/1962 |
| CN | 1514989 | 7/2004 |

(Continued)

*Primary Examiner* — Marcus Charles
(74) *Attorney, Agent, or Firm* — Levine Bagade Han LLP

(57) ABSTRACT

The invention relates to a rolling bearing, in particular in the form of an open-center large rolling bearing, comprising a large number of rolling elements, which are held between at least two raceways, on which the rolling elements roll, wherein spacers are provided between the rolling elements, which spacers keep the rolling elements spaced apart from each other. According to the invention, at least one of the raceways has, in a center portion, an approximately groove-shaped longitudinal recess, in which support arms provided between the spacers run, which support arms reach around the rolling element between two adjacent spacers and support the adjacent spacers against each other in the running direction of the rolling elements.

20 Claims, 3 Drawing Sheets

(56) References Cited

U.S. PATENT DOCUMENTS

| | | | | |
|---|---|---|---|---|
| 6,585,417 B2* | 7/2003 | Kuo | ................... | F16C 33/3825 |
| | | | | 384/49 |
| 7,985,024 B2* | 7/2011 | Matsumoto | ......... | B29C 45/2628 |
| | | | | 384/51 |
| 9,970,477 B2* | 5/2018 | Ingrassia | ................. | F16C 11/06 |
| 2011/0221201 A1 | 9/2011 | Nies | | |
| 2016/0341243 A1 | 11/2016 | Ingrassia | | |

FOREIGN PATENT DOCUMENTS

| | | | | |
|---|---|---|---|---|
| CN | 102132055 | | 7/2011 | |
| CN | 103608599 | | 2/2014 | |
| CN | 106989103 | | 7/2017 | |
| CN | 106996420 | | 8/2017 | |
| CN | 108138839 A | * | 6/2018 | ............ F16C 33/37 |
| DE | 3300655 | | 7/1984 | |
| DE | 3305768 | | 8/1984 | |
| DE | 102004037123 | | 3/2006 | |
| DE | 60315611 | | 6/2008 | |
| DE | 102008038534 | | 2/2010 | |
| DE | 102009049333 | | 4/2011 | |
| DE | 202011051680 | | 12/2011 | |
| DE | 102011003376 | | 8/2012 | |
| DE | 102014106587 | | 11/2015 | |
| DE | 102015214105 | | 2/2017 | |
| EP | 0961045 | | 1/1999 | |
| EP | 1024305 | | 8/2000 | |
| EP | 2518351 | | 10/2012 | |
| EP | 0985851 | | 3/2020 | |
| JP | 2001041303 A | * | 2/2001 | .......... F16C 33/3706 |
| JP | 2004150587 A | * | 5/2004 | .......... F16C 33/3706 |
| JP | 2005030488 A | * | 2/2005 | .......... F16C 29/0607 |
| JP | 2005061572 A | * | 3/2005 | .......... F16C 33/3706 |
| JP | 2009030673 A | * | 2/2009 | .......... F16C 33/3706 |
| JP | 2013185659 A | * | 9/2013 | .......... F16C 33/3706 |
| JP | 2016-109157 | | 6/2016 | |
| JP | 2016-153685 | | 8/2016 | |
| KR | 20030014138 A | * | 2/2003 | ............ F16C 29/065 |
| WO | WO-2009062466 A2 | * | 5/2009 | .......... F16C 33/6629 |
| WO | WO-2012155946 A1 | * | 11/2012 | ............... F16C 19/40 |
| WO | WO-2013029684 A1 | * | 3/2013 | ............... F16C 35/06 |
| WO | WO-2015178382 A1 | * | 11/2015 | .......... F16C 29/0611 |
| WO | WO-2016011892 A1 | * | 1/2016 | .......... F16C 33/3706 |
| WO | WO 2019/048251 | | 3/2019 | |

* cited by examiner

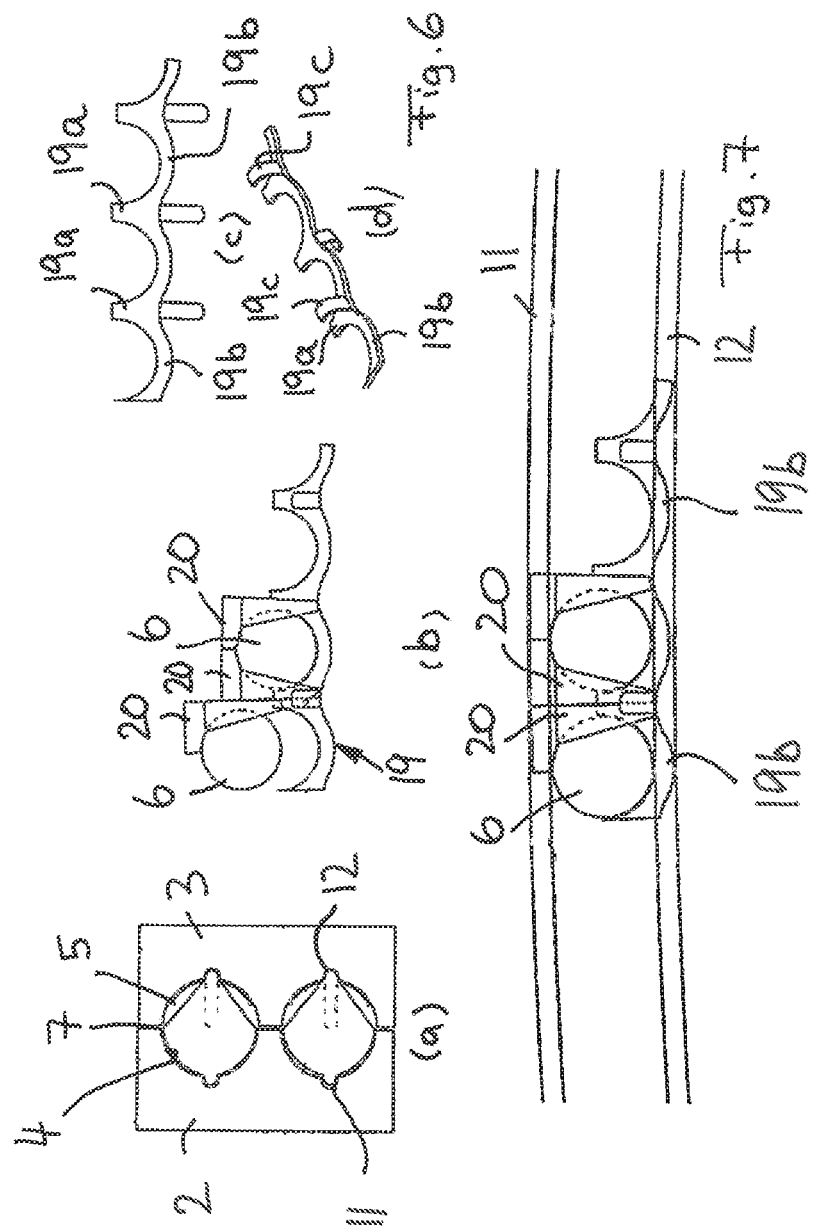

ROLLING BEARING

CROSS-REFERENCE TO RELATED APPLICATIONS

This application is a continuation of International Patent Application Number PCT/EP2018/072822 filed Aug. 23, 2018, which claims priority to German Patent Application Numbers 20 2017 105 464.0 filed Sep. 8, 2017 and 20 2017 107 296.7 filed Nov. 30, 2017, both of which are incorporated herein by reference in their entireties.

BACKGROUND

The present invention relates to a rolling bearing, in particular in the form of a centerless large rolling bearing, having a plurality of rolling elements that are received between at least two raceways on which the rolling elements roll off, wherein spacers that hold the rolling elements spaced apart from one another are provided between the rolling elements.

To hold the rolling elements of a rolling bearing spaced apart from one another and to arrange them evenly distributed in the direction of running, rolling element cages are used as spacers as a rule that typically form a plate-like element in which cutouts for a respective one rolling element are provided at the desired spacing. With a pivot bearing, the rolling element cage forms a ring in which cutouts for the rolling elements are provided at a uniform division so that each rolling element is engaged around by the rolling element cage and adjacent rolling elements are spaced apart from one another by a corresponding web. Friction losses that arise can hereby be kept very small and damage can be avoided.

The circumstance is, however, disadvantageous with such rolling element cages that the raceways are shortened at their margins viewed in cross-section since the rolling element cages require space at the interface between the two raceways so that the required gap between two adjacent raceways requires a certain thickness to be able to receive the lateral margins of the rolling element cage. The rolling element cage typically runs in a plane perpendicular to the main support direction of the rolling bearing, that is, in a plane perpendicular to the direction of rotation with an axial bearing and along a cylindrical surface between the outer ring and the inner ring with a radial bearing.

A shortening of the cross-sectional extent of the raceways at their margins can particularly produce a so-called edge loading with large rolling bearings, but also with other rolling bearings subject to a high load, i.e. very high spot loads occur at the shortened edges between the rolling elements and the raceway. With ball bearings, for example, the raceways of bearings subject to high loads nestle relatively far toward the respective hemispherical shape viewed in cross-section. If the margins of these raceways are shortened for the reason for the arrangement of the rolling element cages, the bearing capacity is reduced and the edge loading can occur, which can result in increased wear or even in damage. This applies analogously to four point contact bearings in which the rolling elements run in quarter shells, i.e. the raceways form quarter shells. A deformation of the structures connected to the bearing can in particular also occur with large rolling bearings.

To avoid the problem of marginal shortening of the raceways, it has already been suggested to use separate, approximately sleeve-like spacers between respective adjacent rolling elements instead of an annular rolling element cage. Due to a lack of engaging around of the rolling elements, such separate spacers do not require any space in the joint between the raceways at their edges so that a marginal shortening of the raceways can be avoided. Such sleeve-like spacers can have a respective cutout of approximately spherical dome shape at oppositely disposed end faces and the cutout of the spacer can nestle against the spherical rolling elements.

However, higher friction losses result as rule in the rolling bearing with such separate spacers only connected to one another by the balls or the rolling elements. A kind of concertina effect can additionally occur that impairs the desired uniform distribution of the rolling elements in the direction of running. If a rolling element is braked as a consequence of increased rolling resistance due to contamination or similar, the trailing rolling elements collide so that a compression of the distribution can occur regionally and a pulling apart of the rolling elements can occur at another region, whereby the transverse guidance of the rolling elements by the spacers is impaired. Such an effect can in particular also occur in an unloaded sector of the rolling bearing in which the transverse guidance effect of the spacer sleeves is not sufficient on its own to exactly guide the rolling elements.

A linear rolling bearing having separate spacers between the rolling elements is shown, for example, by the document EP 2 518 351 A1, with here every second rolling element being surrounded by an annular spacer that keeps the surrounded rolling element at a spacing both with respect to the leading rolling element and to the trailing rolling element.

Document DE 20 2011 051 680 U1, for example, shows a large rolling bearing having spacers in the form of an annular cage.

It is the underlying object of the present invention to provide an improved rolling bearing of the named kind which avoids disadvantages of the prior art and further develops the latter in an advantageous manner. A guidance of the rolling elements that is as exact as possible should in particular also be achieved in unloaded sectors of the rolling bearing without high friction losses or the risk of the aforesaid edge loading having to be accepted in return.

BRIEF SUMMARY

The named object is achieved in accordance with the invention by a rolling bearing in accordance with claim 1. Preferred embodiments of the invention are the subject of the dependent claims.

It is therefore proposed to provide a mutual guidance between respective adjacent spacers that are each arranged between a pair of rolling elements, the mutual guidance being able to transmit the forces between the spacers and to support the spacers against one another in the direction of running of the rolling elements so that the spacers are no longer only mutually positioned relative to one another by rolling elements, but also directly and hold the rolling elements in the desired distribution in the direction of running. The mutual support of the spacers does not, however, take place in the joint between the raceways, but in a center section of a respective raceway so that a marginal shortening of the raceways can be avoided. In accordance with the invention, at least one of the raceways has an approximately groove-shaped longitudinal cutout in a center section in which cutout support arms run that are provided between the spacers, that each engage around the rolling element between two adjacent spacers, and that support the adjacent spacers against one another in the direction of running of the rolling elements. In comparison with conventional rolling element cages that engage around the rolling elements in the joint between the raceways, the support between the spacers is so-to-say tilted by approximately 90° and is laid in a longitudinal cutout in the center section of a raceway.

Each of the raceways on which the rolling element set rolls off can advantageously have such longitudinal cutout arranged approximately centrally so that the rolling elements can be engaged around on oppositely disposed sides by support arms via which the spacers disposed between the rolling elements are supported against one another. A uniform, precise guidance of the rolling elements can hereby also be achieved with support arms of slim dimensions and thus with narrow longitudinal cutouts.

The spacers or their support arms can generally remain unconnected or can be formed separately so that the forces between adjacent spacers substantially only take place by a bumping of the support arms against one another. The spacers can hereby be installed in a simple manner and can be inserted into the intermediate space between the raceways, with this advantageously being able to take place via an assembly hole that can be formed in one or both of the raceway elements. For example, such an assembly cutout that is dimensioned large enough to be able to insert a spacer can be provided laterally at one or both raceway elements, in particular in the region of the joint between the raceways.

Alternatively to a separate configuration of adjacent spacers and their support arms, the spacers can, however, also be connected to one another by the support arms so that a chain of spacers similar to a rolling element cage is formed. In this respect, all the spacers can be connected to one another, for example can form a closed ring, or alternatively only some of the spacers can be respectively connected to one another groupwise so that a plurality of groups of mutually connected spacers are formed overall.

Depending on the design of the spacers combinations thereof can also be provided. Separate spacers that are each arranged between two adjacent rolling elements can in particular be combined with spacers connected to one another in chain form, in particular when the spacers provided between a respective pair of rolling elements are formed as split. For example, a rolling element cage of half-shell shape or half a rolling element cage engaging around the rolling elements at one side can be combined with spacers that hold the rolling elements at a spacing at a side disposed opposite the cage. In this configuration, the half rolling element cage advantageously likewise runs in a groove-like longitudinal cutout provided in the center region of a raceway, with such a half cage being able to have spacer elements between the rolling elements and to have support arms that connect adjacent spacer elements to one another, engage around a respective rolling element, and run in the longitudinal cutout.

If such a half cage is used, spacer elements can be used between adjacent rolling elements at the side disposed opposite the half cage to so-to-say supplement the missing half of the cage and also to support the rolling elements on this half of the intermediate spaces between the rolling elements. The spacer elements can here be connected to the half cage, can in particular be supported thereat.

Independently of the previously explained combination of spacer elements with a half cage, the spacers can also themselves be formed as split so that a respective spacer between a pair of adjacent rolling elements can be composed of two or optionally also more spacer parts. Two complementary spacer halves, preferably in the form of half-shells, can in particular be provided that complement to form a full spacer between a pair of adjacent rolling elements.

In this respect, each spacer can advantageously have a support arm that is received in a longitudinal cutout in the raceway the respective spacer half faces.

Independently of whether the spacers are formed as split or not split between two adjacent rolling elements, the support arms can be integrally molded to the respective spacer in one piece and/or can be rigidly fastened thereto.

A support arm can here have oppositely disposed end sections that are contoured as complementary to one another or at least as placeable next to one another in an exact fit. A leading end of a support arm can, for example, be contoured as slightly spherical or convex, while a trailing end of the support arm can be contoured as slightly depression-shaped or concave.

The support arm of a respective spacer can here be arranged symmetrically and can project respectively equally far in and against the direction of running, in particular approximately up to the axis of rotation of the respective leading or trailing rolling element. Such a symmetrical support arm here engages half of the leading rolling element and half of the trailing rolling element.

Alternatively to such a symmetrical support arm configuration, the support arms can, however, also be formed or arranged offset with respect to the center plane of the spacer. The support arm can, for example, project further in the direction of running as against the direction of running (or also vice versa) with respect to the sleeve-shaped spacer body. The support arm can in particular terminate approximately flush with the spacer body at an end-face end of the spacer body while the oppositely disposed end projects so far that it reaches the end face of the next spacer body, more exactly the end of the support arm there that terminates with the end face of the next spacer body.

If spacers formed as split are used, the splitting plane can generally be selected differently. For example, one spacer can have two spacer halves that are aligned in a plane in parallel with the joint between the two raceways and/or perpendicular to the main support direction of the rolling elements. With an axial bearing, the spacers can, for example, be split in a plane perpendicular to the axis of rotation of the bearing.

Spacers split in this manner can here each have two reception cutouts open toward oppositely disposed sides, for example in the form of a spherical dome corresponding to a quarter sphere, that can each receive two rolling elements running after one another.

Alternatively to such a spacer split in parallel with the joint between the raceways, a spacer can, however, also be split in a plane perpendicular to the direction of running of the rolling elements. In this case, each spacer half can have a reception cutout that receives a respective rolling element. The spacer halves split in such a manner lie here so-to-say back to back.

BRIEF DESCRIPTION OF THE DRAWINGS

The invention will be explained in more detail in the following with respect to preferred embodiments and to associated drawings. There are shown in the drawings:

FIG. 6: a further embodiment of a spacer that represents a combination of a cage formed in half-shell shape and separate spacer pieces, wherein the partial view (a) shows a frontal view in the direction of running and in the installed state, the partial view (b) shows a side view of the assembled, combined spacer in an exploded view in part and in an installed representation in part; the partial view (c) shows a side view of the half cage; and the partial view (d) shows a perspective representation of the half cage; and FIG. 7: a schematic sectional view in a plane through the two groove-like longitudinal cutouts in the center sections of the raceways that shows the arrangement of the support arms and their guidance in the longitudinal cutouts.

DETAILED DESCRIPTION

Figure 1:
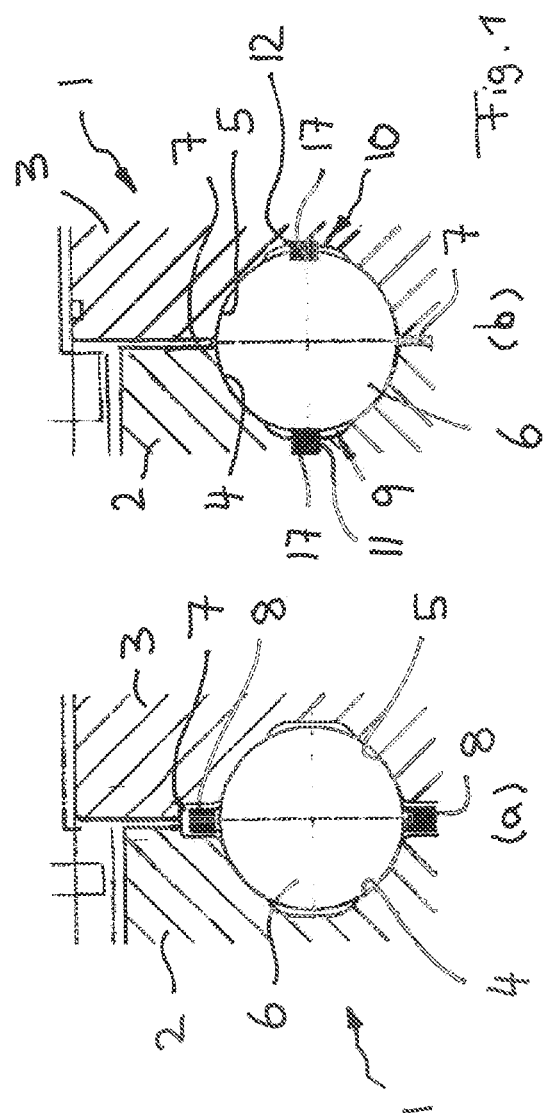
FIG. 1: a schematic sectional view through a rolling bearing having spherical rolling elements, wherein the partial view (a) shows the arrangement of a conventional rolling element cage whose lateral margins are received in the joint between the raceways and shorten the raceways there, while the partial view (b) shows the groove-like longitudinal cutouts in center sections of the raceways and the support arms of the spacers running therein in accordance with an embodiment of the invention.

As FIG. 1 shows, the rolling bearing 1 can be configured as a pivot bearing and can have two bearing races 2, 3, for example in the form of an inner ring and an outer ring, wherein the bearing can be configured as an axial bearing or as a radial bearing or also as a mixed form that supports both axial forces and radial forces.

When configured as a linear bearing, corresponding bearing track elements that extend linearly and can, for example, be formed in a rail-like manner can be provided instead of the two bearing races 2, 3.

Only a rolling element row is shown in FIG. 1, wherein the bearing can naturally also be formed in multiple rows and can comprise one or more axial bearing rows and one or more radial bearing rows.

The mutually rotatable bearing races 2, 3 here each have a raceway 4 or 5 that face one another and are supported against one another by a row of rolling elements 6 that roll off on the raceways 4 and 5.

As FIG. 1 shows, the rolling elements 6 can be formed as spherical. The raceways 4 and 5 can accordingly each be formed as curved in the manner of half-shells to nestle up to the spherical rolling elements 6. Alternatively, four quarter shell-shaped raceways can also be provided in which the rolling elements 6 run when the bearing 1 is configured as a four point contact bearing. It is, however, understood that other rolling elements, for example cylindrical or barrel-shaped rolling elements, and the raceways 4 and 5 can then also be adapted to the rolling elements 6 in a correspondingly different manner.

The partial view (a) of FIG. 1 here shows the arrangement of a conventional rolling element cage that engages around the rolling elements 6 with lateral marginal webs in the joint 7 between the two raceways 4 and 5. To be able to receive the lateral marginal webs 8 of the rolling element cage that forms the spacers between the rolling elements 6, the joint 7 has to have a certain thickness between the bearing races 2 and 3 at the margins of the raceways 4 and 5, which has the result that the raceways 4 and 5 are shortened at their margins viewed in cross-section—as FIG. 1 (a) shows, which can result in the initially explained problem of edge loading.

As FIG. 1 (b) shows, it is advantageous in accordance with an embodiment of the invention if the rolling elements 6 are no longer laterally engaged around in the region of the joint 7, but rather leave open the region of the joint 7 in the center sections 9 and 10 of the raceways 4 and 5 and the spacers, i.e. do not take up any space there so that the joint 7 can be formed considerably smaller. The marginal shortening of the raceways 4 and 5 is hereby avoided and the problem of edge loading is accordingly mitigated.

To be able to engage around the rolling elements 6 in the center sections 9 and 10 of the raceways 4 and 5, a respective groove-like longitudinal cutout 11 and 12 is provided approximately centrally in the raceways 4 and 5, in which longitudinal cutouts 11 and 12 the support arms 17 of the spacers 14 can run by which the adjacent spacers 14 are supported against one another in the direction of running of the rolling elements 6.

If the partial views (a) and (b) of FIG. 1 are compared, it becomes clear that so-to-say the support plane of a conventional rolling element cage in which the support sections of the cage effective in the direction of running run was so-to-say tilted by approximately 90°.

The spacers 14 can here be formed separately from one another so that a separate spacer 14 is provided between every pair of adjacent rolling elements 6. It would nevertheless also be possible to provide a mutually connected spacer chain in the manner of a cage whose support arm sections at the marginal side run in the longitudinal cutouts 11 and 12 in the center sections 9 and 10 of the raceways 4 and 5.

Figure 2:
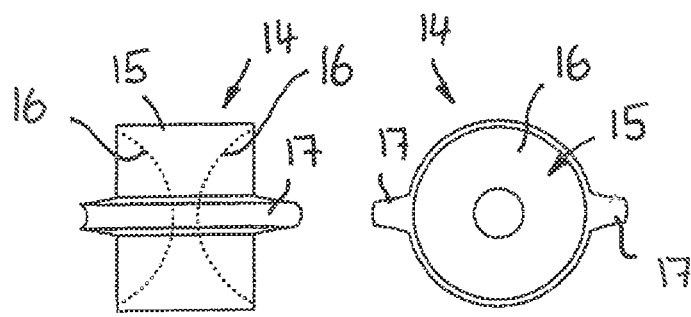
FIG. 2: a schematic representation of a spacer that is configured in one piece in accordance with an advantageous embodiment of the invention, and that has symmetrically formed or centrally arranged support arms, wherein the partial view (a) shows a plan view and the partial view (b) shows a front view in a direction of view in parallel with the direction of running.

As FIG. 2 shows, a respective spacer 14 can be formed in one piece and can comprise an approximately sleeve-shaped or cylindrical spacer body 15 at whose end faces respective reception cutouts 16 adapted to the rolling elements 6 are formed. If the rolling element 6 is spherical, the reception cutout 16 can be contoured at least approximately in spherical dome shape.

At the peripheral sides, the spacer 14 comprises support arms 17 extending in the direction of running of the rolling elements 6, wherein a respective one such support arm 17, and thus in total therefore two support arms 17, can advantageously be provided on oppositely disposed peripheral sides of the spacer 14.

The support arms 17 can here extend in the manner of longitudinal webs or longitudinal rails in the manner of projections at the peripheral side so that the support arms 17 can run in the longitudinal cutouts 11 and 12 in center sections 9 and 10 of the raceways 4 and 5 and are guided therein.

As FIG. 2 shows, the support arms 17 can be symmetrical and can project at the end face over the sleeve body 15 of the spacers 14, advantageously in each case so far that the ends of the support arms 17 come to lie in the region of the axes of rotation of the respective rolling elements 6. The length of the support arms 17 can substantially correspond to the desired split or spacing of two adjacent rolling elements when the spacing is measured from the center to the center of the rolling elements.

As FIG. 2 shows, the end sections of the support arms 17 can be formed as complementary to one another, for example slightly concave at the leading end and slightly spherical at the trailing end, so that the leading end of a support arm 17 of a first spacer comes in engagement with an exact fit with the trailing end of the support arm of a leading spacer.

Figure 3:
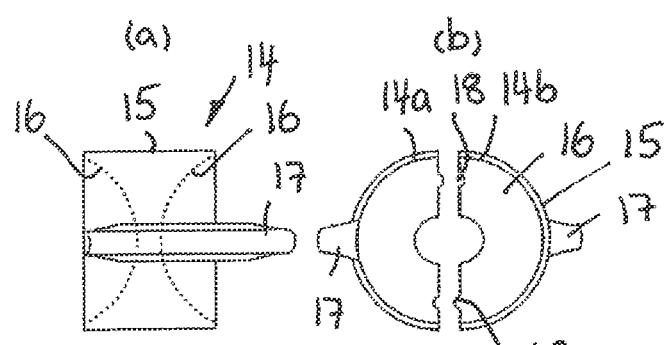
FIG. 3: a schematic representation of a spacer that is configured in one piece in accordance with an advantageous embodiment of the invention and that has support arms formed eccentrically or offset, wherein the partial view (a) shows a plan view and the partial view (b) shows a front view in a direction of view in parallel with the direction of running.

As FIG. 3 shows, the support arms 17 can, however, also be formed asymmetrically or offset with respect to a center plane of the cylindrical spacer body 15.

An end section of a support arm 17 can, for example, terminate approximately flush with the spacer body 15 or its front face while the oppositely disposed support arm end projects over the oppositely disposed end face of the spacer 14. The length of the support arm 17 overall can here in turn correspond to the split between adjacent rolling elements.

As FIG. 3 further shows, a spacer 14 can also be formed as split and can be composed of two spacer halves 14a and 14b. A split plane can here be aligned in parallel with the plane of the joint 7 between the raceways 4 and 5.

The two halves of the spacer 14 can here be connected and/or latched in a shape matched manner to one another, for example by means of a mutually engaging pin connector or of a different contour latching 18.

Figure 4:
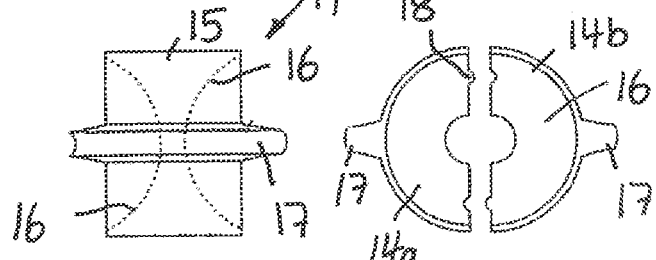
FIG. 4: a schematic representation of a spacer that is configured in two pieces in accordance with an advantageous embodiment of the invention and that has symmetrically formed support arms, wherein the partial view (a) shows a plan view and the partial view (b) shows a front view in a direction of view in parallel with the direction of running.

As FIG. 4 shows, such a split configuration of the spacers 14 can also have symmetrically configured and arranged support arms 17 that, in a similar manner as in the embodiment in accordance with FIG. 2, project approximately equally far over the spacer body 15 at the end face. More precisely, the configuration of the support arms 17 is centered since the end sections of the support arms 17 can, in the aforesaid manner, be complementary to or different from one another, but exactly fitting one another.

Figure 5:
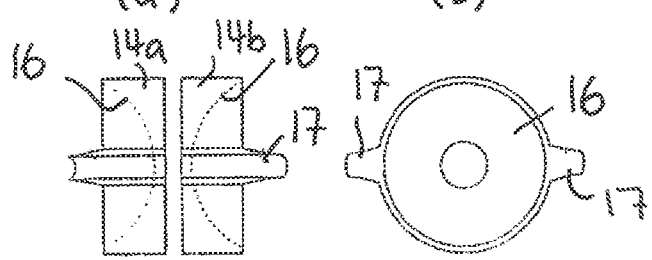
FIG. 5: a schematic representation of a spacer that is configured in two pieces in accordance with an advantageous embodiment of the invention, and that has symmetrically formed support arms, wherein the partial view (a) shows a plan view and the partial view (b) shows a front view in a direction of view in parallel with the direction of running, wherein the spacer is split in a plane perpendicular to the direction of running.

As FIG. 5 shows, a spacer 14 can also be configured as split in a plane perpendicular to the direction of running of the rolling elements 6. In this case, the spacer halves so-to-say lie back to back, with each spacer half having a reception cutout 16 for a rolling element 6. In the previously described embodiment in accordance with FIGS. 3 and 4, whose splitting plane is in parallel with the joint 7, each spacer half comprises two half reception cutouts 16.

As FIGS. 6 and 7 show, the spacers 14 can also comprise a cage-like spacer structure 19 that can be combined with additional spacer pieces 20. An approximately half shell-shaped half cage 19 can in particular be provided that engages around a plurality of or all of the rolling elements 6 at a peripheral side and has spacer sections 19a that project between adjacent rolling elements 6 and that are connected to one another by support arm sections 19b, with the support arm sections 19b laterally engaging around the rolling elements 6.

The support arm sections 19b here run in the longitudinal cutout 12 of the raceway 5 that can be provided in its center section 10. The cage-like spacer structure 19 so-to-say forms a half cage whose lateral marginal section runs in the longitudinal cutout 12.

To also support the rolling elements 6 at the oppositely disposed side, that is not supported by the cage-like spacer structure 19, the additional spacer pieces 20 can be used that can, similar to the split spacers of the embodiment in accordance with FIG. 5, be split in a plane perpendicular to the direction of running.

The spacer pieces 20 can here each have a reception cutout 16 at the end face that nestles against a respective rolling element 6.

As FIGS. 6 and 7 show, the spacer pieces 20 can be supported at or fastened to bearing sections 19c at the half cage-like spacer structure 19. The bearing sections 19c can, for example, be integrally molded in one piece to the cage-like spacer structure 19 and/or can be rigidly connected thereto and/or can, for example, form a reception contour in the form of a projection at which the spacer pieces 20 are fixable in a shape matched manner.

We claim:

1. A rolling bearing having rolling elements that are received between at least two raceways on which the rolling elements roll off,
    wherein spacers that space the rolling elements apart from one another are provided between the rolling elements,
    wherein at least one of the at least two raceways has an approximately groove-like longitudinal cutout in a center section in which support arms run,
    wherein the support arms are between the spacers,
    wherein each of the support arms engage around at least one of the rolling elements between two adjacent spacers,
    wherein the support arms support adjacent spacers against one another in a direction of running of the rolling elements, and
    wherein the support arms have a thickness transversely to the direction of running of the rolling elements that is greater than a clearance of a joint between the at least two raceways at margins of the at least two raceways.

2. The rolling bearing of claim 1, wherein each of the at least two raceways has one of the groove-like longitudinal cutouts, wherein each of the groove-like longitudinal cutouts is approximately centrally located on one of the at least two raceways; and wherein the support arms are on oppositely disposed sides of the spacers.

3. The rolling bearing of claim 1, wherein the support arms each have a length that at least corresponds to a desired spacing of axes of rotation of the rolling elements.

4. The rolling bearing of claim 1, wherein the support arms form guide rails that extend in parallel with the direction of running of the rolling elements and that project at the spacers at a peripheral side.

5. The rolling bearing of claim 1, wherein the support arms are arranged centered or symmetrical with respect to a center plane of the spacers that extends perpendicular to the direction of running of the rolling elements through a center of the spacers and project approximately equally far over oppositely disposed end faces of a respective spacer body.

6. The rolling bearing of claim 1, wherein the support arms are arranged eccentrically offset with respect to a center plane of the spacers that extends perpendicular to the direction of running of the rolling elements through a center of the spacers such that a support arm end terminates approximately flush with an end face of a respective spacer body and an oppositely disposed support arm end projects over an oppositely disposed end face of the spacer body.

7. The rolling bearing of claim 1, wherein the spacers are configured as split and comprise spacer parts or two spacer halves between two adjacent rolling elements, and wherein a splitting plane is arranged between the spacer parts or the two spacer halves approximately in parallel with the joint.

8. The rolling bearing of claim 7, wherein the spacer parts of at least one of spacers are fixed to one another with shape matching.

9. The rolling bearing of claim 1, wherein the spacers are configured as split and comprise spacer parts or two spacer halves between two adjacent rolling elements, and wherein a splitting plane is arranged between the spacer parts or the two spacer halves approximately perpendicular to the direction of running of the rolling elements.

10. The rolling bearing of claim 1, wherein the support arms are molded integrally in one piece with the spacers or are rigidly connected to the spacers.

11. The rolling bearing of claim 1, wherein the rolling elements are spherical, wherein the at least two raceways comprise half-shells, and wherein the at least two raceways nestle up to the spherical rolling elements.

12. The rolling bearing of claim 1, wherein the rolling bearing is configured as a four point contact bearing and has four raceway sections or a quarter shell shape in which the rolling elements run; and wherein the approximately groove-like longitudinal cutout and the spacers received therein are provided in a raceway body between two raceway sections formed thereat.

13. A rolling bearing having rolling elements that are received between at least two raceways on which the rolling elements roll off, wherein spacers that space the rolling elements apart from one another are provided between the rolling elements, wherein at least one of the at least two raceways has an approximately groove-like longitudinal cutout in a center section in which support arms run, wherein the support arms are between the spacers, wherein each of the support arms engage around at least one of the rolling elements between two adjacent spacers, wherein the support arms support adjacent spacers against one another in a direction of running of the rolling elements, and wherein the spacers comprise a half cage-like spacer structure that has spacer sections that are arranged between a plurality of adjacent rolling element pairs of the rolling elements and that are connected to one another by support arm sections, with the support arm sections running in the approximately groove-like longitudinal cutout of at least one of the at least two raceways and each engaging around a respective rolling element.

14. The rolling bearing of claim 13, wherein the cage-like spacer structure is approximately plate-like and is aligned approximately in parallel with a main force removal direction of the rolling elements.

15. The rolling bearing of claim 13, wherein spacer pieces are provided between the rolling elements that extend between two respective adjacent rolling elements.

16. The rolling bearing of claim 13, wherein the spacer pieces are supported at and/or fastened to the cage-like spacer structure.

17. The rolling bearing of claim 15, wherein the spacer pieces are each formed as split and comprise a plurality of parts between two respective adjacent rolling elements that are separated by a separation plane approximately perpendicular to the direction of running of the rolling elements.

18. The rolling bearing of claim 13, wherein the support arms have a thickness transversely to the direction of running of the rolling elements that is greater than a clearance of a joint between the at least two raceways at margins of the at least two raceways.

19. A rolling bearing having rolling elements that are received between at least two raceways on which the rolling elements roll off,
  wherein spacers that space the rolling elements apart from one another are provided between the rolling elements,
  wherein at least one of the at least two raceways has an approximately groove-like longitudinal cutout in a center section in which support arms run,
  wherein the support arms are between the spacers,
  wherein each of the support arms engage around at least one of the rolling elements between two adjacent spacers,
  wherein the support arms support adjacent spacers against one another in a direction of running of the rolling elements, and
  wherein the support arms are arranged eccentrically offset with respect to a center plane of the spacers that extends perpendicular to the direction of running of the rolling elements through a center of the spacers such that a support arm end terminates approximately flush with an end face of a respective spacer body and an oppositely disposed support arm end projects over an oppositely disposed end face of the spacer body.

20. A rolling bearing having rolling elements that are received between at least two raceways on which the rolling elements roll off,
  wherein spacers that space the rolling elements apart from one another are provided between the rolling elements,
  wherein at least one of the at least two raceways has an approximately groove-like longitudinal cutout in a center section in which support arms run,
  wherein the support arms are between the spacers,
  wherein each of the support arms engage around at least one of the rolling elements between two adjacent spacers,
  wherein the support arms support adjacent spacers against one another in a direction of running of the rolling elements,
  wherein the spacers are configured as split and comprise spacer parts or two spacer halves between two adjacent rolling elements, and
  wherein a splitting plane is arranged between the spacer parts or the two spacer halves approximately in parallel with a joint between the at least two raceways or approximately perpendicular to the direction of running of the rolling elements.

* * * * *